May 8, 1951 R. J. MUELLER 2,551,811
CUTTER AND SEALER
Filed April 30, 1947
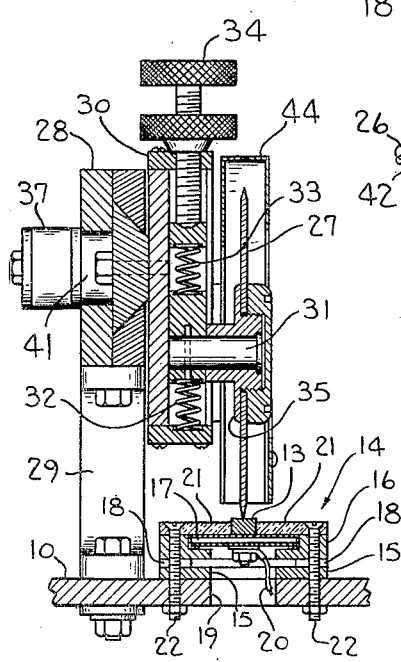
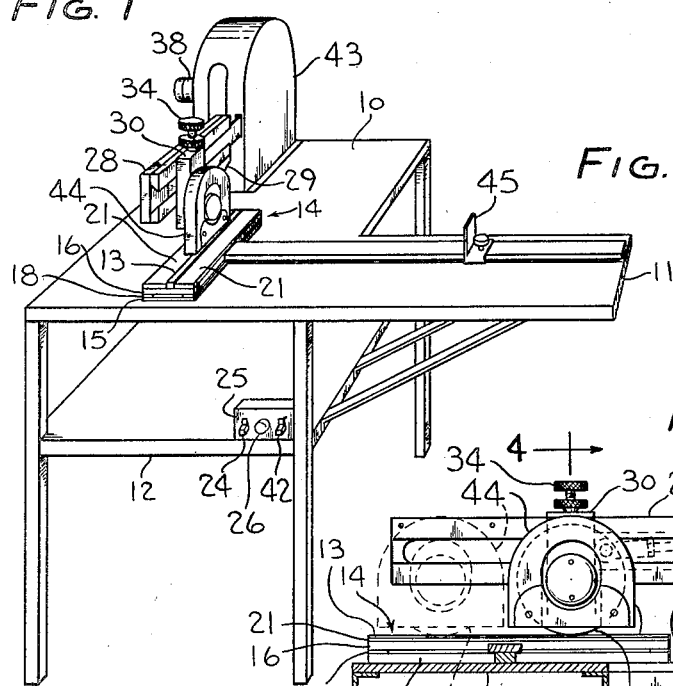
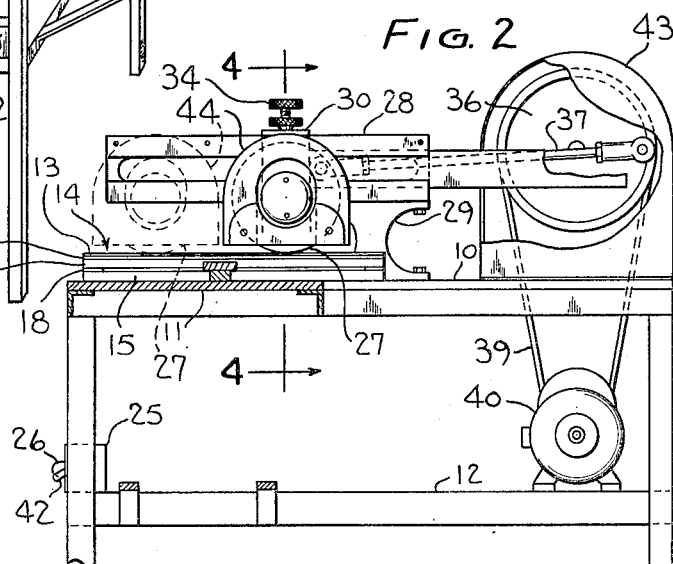
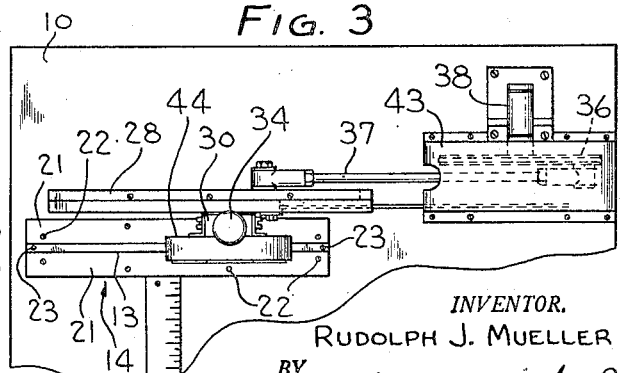
INVENTOR.
RUDOLPH J. MUELLER
BY John W. Michael
ATTORNEY Patented May 8, 1951

2,551,811

UNITED STATES PATENT OFFICE 2,551,811

CUTTER AND SEALER

Rudolph J. Mueller, Milwaukee, Wis., assignor to Holeproof Hosiery Co., Milwaukee, Wis., a corporation of Wisconsin Application April 30, 1947, Serial No. 744,879

1 Claim. (Cl. 164—77)

This invention relates to improvements in combined cutters and sealers of the type particularly adapted for cutting and simultaneously sealing the cut edge of fabric or thread wholly or partly formed of fusible fibre such as synthetic fibre-forming polymeric amides having a protein-like chemical structure commonly defined by the generic term nylon.

In the manufacture of garments it is convenient to pre-cut predetermined lengths of elastic fabric tape which is later assembled. During the handling of such lengths their cut edges tend to fray and unravel and thus become unsightly and unusable for the purposes designed. In such case it is either necessary to recut the fabric at the time of assembly or to stop off the raveled edge by stitching or other additional step to prevent it from unraveling.

It is an object of this invention, therefore, to provide a cutter which will automatically seal the cut ends of the threads or fibre comprising the fabric simultaneously with the cutting thereof and thus prevent fraying and unraveling.

This object is obtained by providing a pair of co-operating cutting members at least one of which is heated to a temperature sufficient to melt and fuse together the various ends of the thread or fibre as they are severed by the cutting action.

The novel features, which are considered characteristic of the invention are set forth with particularity in the appended claim. The invention itself, however, both as to its organization and its method of operation, together with additional objects and advantages thereof, will best be understood from the following description of a specific embodiment when read in connection with the accompanying drawing, in which:

Fig. 1 is a perspective view of a cutter and sealer embodying the present invention;

Fig. 2 is a view in side elevation of such cutter and sealer with parts being shown in section for the sake of clarity in illustration;

Fig. 3 is a fragmentary top plan view of the cutter and sealer viewed in Fig. 2;

Fig. 4 is a sectional view taken on line 4—4 of Fig. 2;

Fig. 5 is a top plan view of a piece of fabric ribbon the end of which is shown cut and sealed; and Fig. 6 is a similar view of a like piece of fabric the end of which has been cut but not sealed.

Referring to the drawing by reference numerals, the cutter and sealer is mounted on a table having a top 10 with a side extension 11 and a lower platform 12. The extension 11 permits longer pieces of fabric to be measured prior to cutting. An elongated anvil 13, formed of metal such as cold rolled steel, is mounted in a block, indicated generally at 14, bolted to the top 10. This block is comprised of a slotted bottom member 15 a slotted and recessed intermediate member 16, and a two plate top member 21. The bottom member 15 and intermediate member 16 are spaced from each other by spacer blocks 18 mounted at each corner. This permits movement of air into the space between such members. The top 10 is slotted, as indicated at 19, to permit the lead wires 20 from a strip heater 17 to extend below the table top. The strip heater 17 is of standard construction having a capacity of 250 watts and it is supported in the recess of member 16 with its top opening upwardly. The anvil 13 rests directly on such heater to accomplish the most efficient heat exchange. The two plates of the top member 21 and the members 16 and 15 are bolted to the top 10 by bolt and nuts indicated at 22. The plates of the top member 21 are made of hard, high heat resistant insulating material, such as is now commercially available. They cover the strip heater 17 and border along the anvil 13, thus concentrating their heat at the point of contact with the anvil. Their gripping action is probably sufficient to hold the anvil in place. However, it is preferable to also fasten the ends of the anvil 13 by countersunk screws 23 positioned at each end thereof and fastened in the intermediate member 16.

The strip heater 17 may be connected to a source of electrical power of 110 volts through the operation of an electrical switch 24 mounted in a terminal box 25 on the lower platform 12. When the switch 24 is turned on an indicator bulb 26 is lighted to warn the operator that the strip heater is in operation. After the power is on for a short time the temperature of the anvil 13 will be raised to approximately 650° F.

The anvil 13 constitutes one of the cooperable cutting members of the cutter. The other cutting member consists of a roller blade or disc cutter 27 which rolls back and forth along the surface of the anvil 13. As the blade 27 comes in contact with a piece of fabric resting on the anvil 13, it will cut through the fibres of which the fabric is comprised and at the same time press those fibres against the surface of the anvil 13. This transfers sufficient heat to the cut ends of the fibres to cause such of them as are fusible to partially melt and fuse with other of such cut fibres. Hence the fibres and thread ends are cut and sealed against unraveling simultaneously by the action of the blade 27 and the heated anvil 13. In order to longitudinally guide the blade 27 back and forth along the anvil 13, and to provide resilient pressure urging it in contact with the anvil with a desired force, a guide member 28 is mounted by means of a bracket 29 to the top 10. The guide 28 is positioned above and to one side of the block 14. It is made up of a slotted main member and two retaining members which are secured to the face of the main member. A crosshead 30, by means of a supporting block traveling in the track of the guide 28, is constrained for movement along such guide. The crosshead 30 mounts a blade spindle 31 for vertical movement with respect to the crosshead. To be so mounted the spindle 31 is supported in a sliding member carried by the crosshead. A spring 32, positioned between the sliding member and the crosshead, adjustably supports such member while downward pressure is supplied through spring 33. The compression of this latter spring is adjusted by a screw 34 acting through a pillow block. There is rotatably mounted on the spindle 31 a blade-carrying hub 35. The blade 27 is removably carried by this hub in a well-known manner. By adjustment of the screw 34 the spring tension urging the blade 27 into contact with the anvil 13 may be increased or decreased. This is usually determined empirically dependent upon the thickness or gauge of the fabric and the type of fibre to be cut.

The reciprocal movement of the blade 27 is accomplished by a crank 36 and pitman 37. The crank 36 is mounted on the table 10 by means of a bearing bracket 38. Rotative power for the crank is supplied by a driving belt 39 from a motor 40 mounted below the table on the platform 11. The pitman 37 is fastened by means of a stud shaft 41 to the crosshead 30, the shaft 41 passing through the elongated slot formed in the main member of the guide 28. The operation of the motor 40 is controlled by electrical switch 42. There is sufficient reduction gearing preferably of the variable type (not shown) associated with the motor 40 to cause the crank 36 to rotate at approximately twenty-two R. P. M. The stroke of the crank 36 is approximately seven inches. Hence, the blade 27 for practical purposes travels at the rate of approximately twenty-five feet per minute. This rate of speed has been found satisfactory for the average operator although such rate may be varied. In order to insure the safety of the operator, a housing 43 is mounted on the top 10 and encloses the crank 36 and a housing 44, open at the bottom, is mounted on the crosshead 30 and, as nearly as is practically possible, encloses the cutter blade 27. The bottom of the housing 44 is sufficiently spaced from the anvil 13 to clear the fabric which is to be cut. As is customary with fabric-cutting devices, a standard length measuring device, indicated generally at 45, is mounted on the top 10 and the extension 11. It is adjustable to measure desired lengths of the fabric.

In the operation of the device, the operator sets the gauge 45 at the desired length and draws a length of fabric, such as elastic ribbon, across the top 10 until its end coincides with the gauge and its body lies on the anvil 13. The rate of reciprocation of the blade is, of course, slow enough to permit such positioning to take place while the blade is being retracted to the position shown in full lines in Fig. 2. As the blade moves forward to its extended position shown by the dotted lines it cuts across the fabric held on the anvil 13. The fibre of such fabric is severed by the action of the blade 27 and the cooperating anvil 13 and the heat of the anvil is transmitted at the same time to the severed portions of the fibre fusing them in such a manner that cut portions of one fibre are joined to cut portions of adjacent fibres, thus sealing them and preventing individual fibres from becoming loose and ravelled. With fabric which is made partly of fusible fibres and partly of non-fusible fibres, it has been found that the sealing of the fusible fibres tends to gather together and hold the unfusible fibres and still make an effective seal of the cut edge. As soon as the cut and seal have been completed the cut-off portion is slid from the table into a container. Then while the cutter blade is moving to its extended position and thereafter returning to its fully retracted position, the operator places another length of the fabric in position for cutting. It should be noted that because the blade 27 is always in contact with the heated anvil 13 it will itself become heated to a certain extent. This, however, is not a detriment. In order to commence operation of the device after it has been shut down for a sufficient period of time to permit the anvil to cool, a pre-heating period of from three to four minutes must be permitted before the sealing action will again take place. However, during such pre-heating time it is advisable to also have the blade operating in order that any heat to be transmitted to it will be transmitted evenly along the portion of its cutting edge then in use. Because the circumference of the blade in many instances will be greater than the length of the stroke, not all of the cutting edge of the cutter is utilized. The advantage of this is that the cutter may be raised from contact with the anvil 13 and rotated through a part of the revolution and thereafter a new cutting edge will be presented to the anvil.

Although only one embodiment of the invention is shown and described herein, it will be understood that this application is intended to cover such changes or modifications as come within the spirit of the invention or scope of the following claim.

I claim:

A cutter and sealer for fabric or threads made of fusible fibres comprising a support having a recess, an elongated flat, electrical strip heater mounted on said support in said recess, an elongated, flat metal anvil superimposed and directly resting on said heater and adapted to be heated thereby, a pair of heat-resistant members on said heater, said members engaging said anvil therebetween, a guide mounted above said support, a crosshead movably mounted in said guide, a roller blade spindle in said crosshead, a roller blade rotatably mounted on said spindle and having its cutting edge in contact with said anvil, resilient means for pressing said blade into contact with said anvil, and reciprocating means for moving said crosshead back and forth in said guide to cause said blade to roll back and forth on said anvil.

RUDOLPH J. MUELLER.

REFERENCES CITED

The following references are of record in the file of this patent:

UNITED STATES PATENTS

| Number | Name | Date |
|---|---|---|
| 65,173 | Chubbuck | May 28, 1867 |
| 850,485 | Ott | Apr. 16, 1907 |
| 957,595 | Barker | May 10, 1910 |
| 2,251,282 | Huizenga | Aug. 5, 1941 |
| 2,293,178 | Stocker | Aug. 18, 1942 |
| 2,327,468 | Stocker | Aug. 24, 1943 |